(12) United States Patent
Felemban et al.

(10) Patent No.: US 9,599,480 B2
(45) Date of Patent: Mar. 21, 2017

(54) VEHICLE LOCALIZATION AND TRANSMISSION METHOD AND SYSTEM USING A PLURALITY OF COMMUNICATION METHODS

(71) Applicant: Umm Al-Qura University, Makkah (SA)

(72) Inventors: Emad Felemban, Makkah (SA); Adil Amjad Ashraf Sheikh, Makkah (SA)

(73) Assignee: Umm Al-Qura University, Makkah (SA)

( * ) Notice: Subject to any disclaimer, the term of this patent is extended or adjusted under 35 U.S.C. 154(b) by 42 days.

(21) Appl. No.: 14/640,228

(22) Filed: Mar. 6, 2015

(65) Prior Publication Data

US 2016/0258766 A1    Sep. 8, 2016

(51) Int. Cl.
| | | |
|---|---|---|
| *G01C 21/28* | (2006.01) | |
| *G08G 1/0967* | (2006.01) | |
| *G01S 5/00* | (2006.01) | |
| *G08G 1/16* | (2006.01) | |
| *G01C 21/36* | (2006.01) | |
| *H04L 29/08* | (2006.01) | |
| *H04W 88/06* | (2009.01) | |
| *G08G 1/0968* | (2006.01) | |
| *G01S 19/17* | (2010.01) | |

(52) U.S. Cl.
CPC ......... *G01C 21/28* (2013.01); *G01C 21/3691* (2013.01); *G01S 5/0027* (2013.01); *G08G 1/096741* (2013.01); *G08G 1/161* (2013.01); *G01S 19/17* (2013.01); *G01S 2205/008* (2013.01); *G08G 1/096844* (2013.01); *H04L 67/12* (2013.01); *H04W 88/06* (2013.01)

(58) Field of Classification Search
CPC .... G01C 21/3691; G01C 21/28; G01C 21/24; G01C 21/26; G01S 5/0027; G01S 19/17; G01S 2205/008; G08G 1/096741; G08G 1/096844; G08G 1/161; H04L 67/12; H04W 48/18; H04W 88/06
See application file for complete search history.

(56) References Cited

U.S. PATENT DOCUMENTS

| | | | |
|---|---|---|---|
| 7,937,498 B2 * | 5/2011 | Dowling | G06Q 20/04 |
| | | | 709/230 |
| 8,196,835 B2 | 6/2012 | Emanuel et al. | |
| 8,655,588 B2 | 2/2014 | Wong et al. | |

(Continued)

FOREIGN PATENT DOCUMENTS

CN    103383811 A    11/2013

OTHER PUBLICATIONS

Drawil, et al., "Emerging new trends in hybrid vehicle localization systems" Feb. 3, 2012, Global Navigation Satellite Systems: Signal, Theory and Applications, pp. 279-298, http://cdn.intechopen.com/pdfs-wm/27719.pdf.

*Primary Examiner* — Jason Holloway
(74) *Attorney, Agent, or Firm* — Oblon, McClelland, Maier & Neustadt, L.L.P.

(57) ABSTRACT

A vehicle localization system and method uses a hybrid communication layer. The system and method detect a vehicle location and transmit the vehicle location to an application layer using a plurality of communication methods. In addition, the method and system can determine a preferable communication method. The preferable communication method can be dependent on past vehicle locations.

13 Claims, 15 Drawing Sheets

(56) References Cited

U.S. PATENT DOCUMENTS

| | | | |
|---|---|---|---|
| 8,725,831 B2 | 5/2014 | Barbeau et al. | |
| 9,124,692 B2* | 9/2015 | Bhargava | H04L 51/14 |
| 2003/0055555 A1* | 3/2003 | Knockeart | G01C 21/3415 |
| | | | 342/357.31 |
| 2003/0130005 A1* | 7/2003 | Weisshaar | H04W 48/14 |
| | | | 455/525 |
| 2005/0222764 A1* | 10/2005 | Uyeki | G01C 21/3415 |
| | | | 701/414 |
| 2008/0186166 A1* | 8/2008 | Zhou | G01S 5/0027 |
| | | | 340/539.13 |
| 2012/0096095 A1* | 4/2012 | Bhargava | H04L 51/14 |
| | | | 709/206 |
| 2013/0282277 A1* | 10/2013 | Rubin | G08G 9/02 |
| | | | 701/517 |
| 2015/0177736 A1* | 6/2015 | Anderson | G05D 1/0274 |
| | | | 701/25 |

* cited by examiner

1000

Vehicle ID:902A

| Vehicle position GPS coordinates | Communication method | Result | Date & time |
|---|---|---|---|
| N 25° 06' 27" W 73° 07' 26" | WiFi | Unsuccessful | 1/1/2014 15:06 |
| N 25° 07' 27" W 73° 07' 26" | 3G/4G | Successful | 1/1/2014 15:07 |
| N 25° 07' 28" W 73° 07' 27" | 3G/4G | Successful | 1/1/2014 15:08 |

1002

Vehicle ID:400C

| Vehicle position GPS coordinates | Communication method | Result | Date & time |
|---|---|---|---|
| N 25° 07' 27" W 73° 07' 25" | 3G/4G | Successful | 1/1/2014 13:00 |
| N 25° 07' 27" W 73° 07' 26" | Satellite | Successful | 1/1/2014 13:01 |

*Fig. 10*

| Vehicle ID | Vehicle position GPS coordinates | Communication method | Result | Date & time |
|---|---|---|---|---|
| 400C | N 25° 07' 27"<br>W 73° 07' 25" | 3G/4G | Successful | 1/1/2014<br>13:00 |
| 400C | N 25° 07' 27"<br>W 73° 07' 26" | Satellite | Successful | 1/1/2014<br>13:01 |
| 902A | N 25° 06' 27"<br>W 73° 07' 26" | WiFi | Unsuccessful | 1/1/2014<br>15:06 |
| 902A | N 25° 07' 27"<br>W 73° 07' 26" | 3G/4G | Successful | 1/1/2014<br>15:07 |
| 902A | N 25° 07' 28"<br>W 73° 07' 27" | 3G/4G | Successful | 1/1/2014<br>15:08 |

| Area | Localization technique | Accuracy | Status |
|---|---|---|---|
| N 25° 07' 27"<br>W 73° 07' 26"<br>N 25° 07' 29"<br>W 73° 07' 28"<br>N 25° 07' 29"<br>W 73° 07' 30" | GPS | 4 m | Ok |
| N 25° 07' 27"<br>W 73° 07' 26"<br>N 25° 07' 29"<br>W 73° 07' 28"<br>N 25° 07' 29"<br>W 73° 07' 30" | Camera | 0.5 m | Ok |
| N 25° 07' 27"<br>W 73° 07' 26"<br>N 25° 07' 29"<br>W 73° 07' 28"<br>N 25° 07' 29"<br>W 73° 07' 30" | Cellular | 100 m | Not Ok |
| N 25° 06' 27"<br>W 73° 06' 26"<br>N 25° 06' 20"<br>W 73° 06' 26"<br>N 25° 06' 25"<br>W 73° 06' 26" | GPS | 4 m | Ok |

1400

VEHICLE LOCALIZATION AND TRANSMISSION METHOD AND SYSTEM USING A PLURALITY OF COMMUNICATION METHODS

BACKGROUND

In a vehicle localization system, communications difficulties can arise due to terrain topologies. Failures in vehicle location transmission that arise due to the communication difficulties are undesirable. This situation is especially undesired when viable communication is essential, for example, for the transmission of emergency vehicle location. In addition, in other situations, a user may need to transmit a location to emergency vehicles. For example, the user may get into an accident and need to transmit the vehicle location to first responders with a minimum risk of communication failure.

Moreover, in some situations, a communication method may be congested during a specific period. For example, 3G/4G network may become congested when special events are taking place in a city such as pilgrimage or athletic events due to the increase in cell phone usage. This leads to failure in other services based on vehicle localization. Accordingly, what is needed is a vehicle localization system that is able to transmit vehicle location and information with a low probability of communication failure occurring due to communication obstacles.

The foregoing "background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

A vehicle localization and transmission method is provided that comprises detecting a vehicle location, storing a transmission log indicating a status of a communication attempt and a corresponding vehicle location, determining a preferable communication method based on the transmission log from a plurality of communication methods, and transmitting the vehicle location using the preferable communication method.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10 shows logs from two communication controllers according to an example;

FIG. 11 shows a merged transmission log from the logs showed in FIG. 10 according to an example;

FIG. 14 is an exemplary localization look-up table showing localization techniques available in a plurality of areas according to one example.

DETAILED DESCRIPTION

Figure 1:
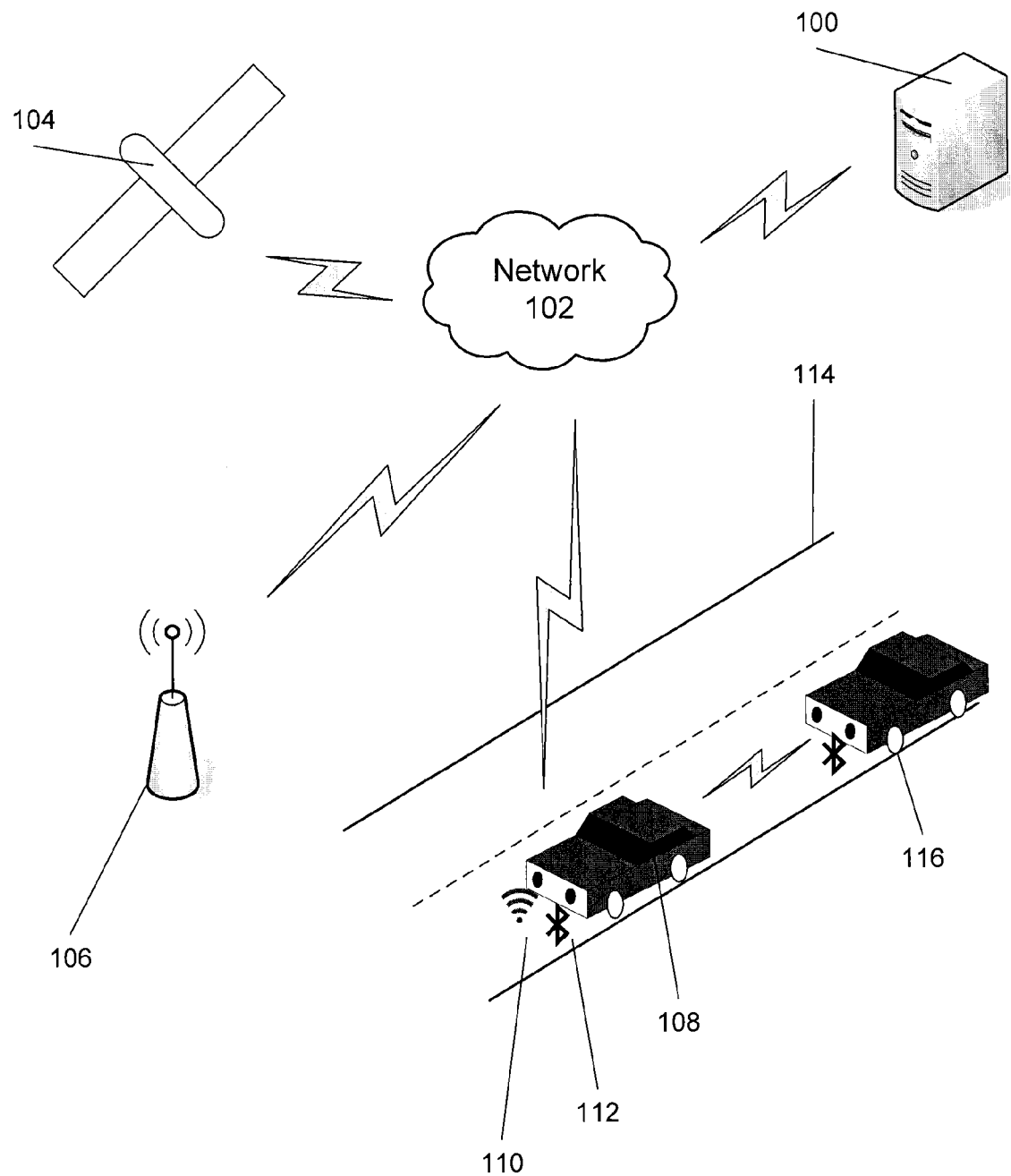
FIG. 1 is an exemplary schematic of a system for vehicle localization using a hybrid communication layer according to one example.

Referring now to the drawings, wherein like reference numerals designate identical or corresponding parts throughout several views, the following description relates to a vehicle localization system using a hybrid communication layer and associated methodology for detecting, transmitting and analyzing vehicle location and information.

Specially, as shown in the drawings and related discussion, when a vehicle location is needed the system may determine a preferable communication method from a plurality of communication methods to be used to send the vehicle location to a server. In one embodiment, processing circuitry may use past known vehicle locations to choose the preferable communication method. The system then transmits to the server the vehicle location using communication circuitry corresponding to the preferable communication method.

Current systems used to obtain the vehicle location are sometimes dependent on Global Positioning System (GPS) or Global System for Mobile (GSM)-assistance based subsystems that detect the vehicle location and transmit it to geographical information systems for localization, tracking and navigation assistance via transmission technologies such as 2G/3G/4G mobile networks. These systems do not provide high resolution location information. Moreover, the dependence of the current systems on terrestrial mobile networks becomes a limit in mixed terrain environments such as the Holy city of Makkah where mountains, tunnels, high-rise buildings, valleys hinder accurate localization.

The proposed system provides high-resolution position of vehicles in mixed terrain environments by using multiple localization technologies and multimodal localization algorithms to get accurate location of vehicles. The vehicle location is transmitted from vehicles to the server via the hybrid communication layer to subside congested or scarcely available data services.

Figure 15:
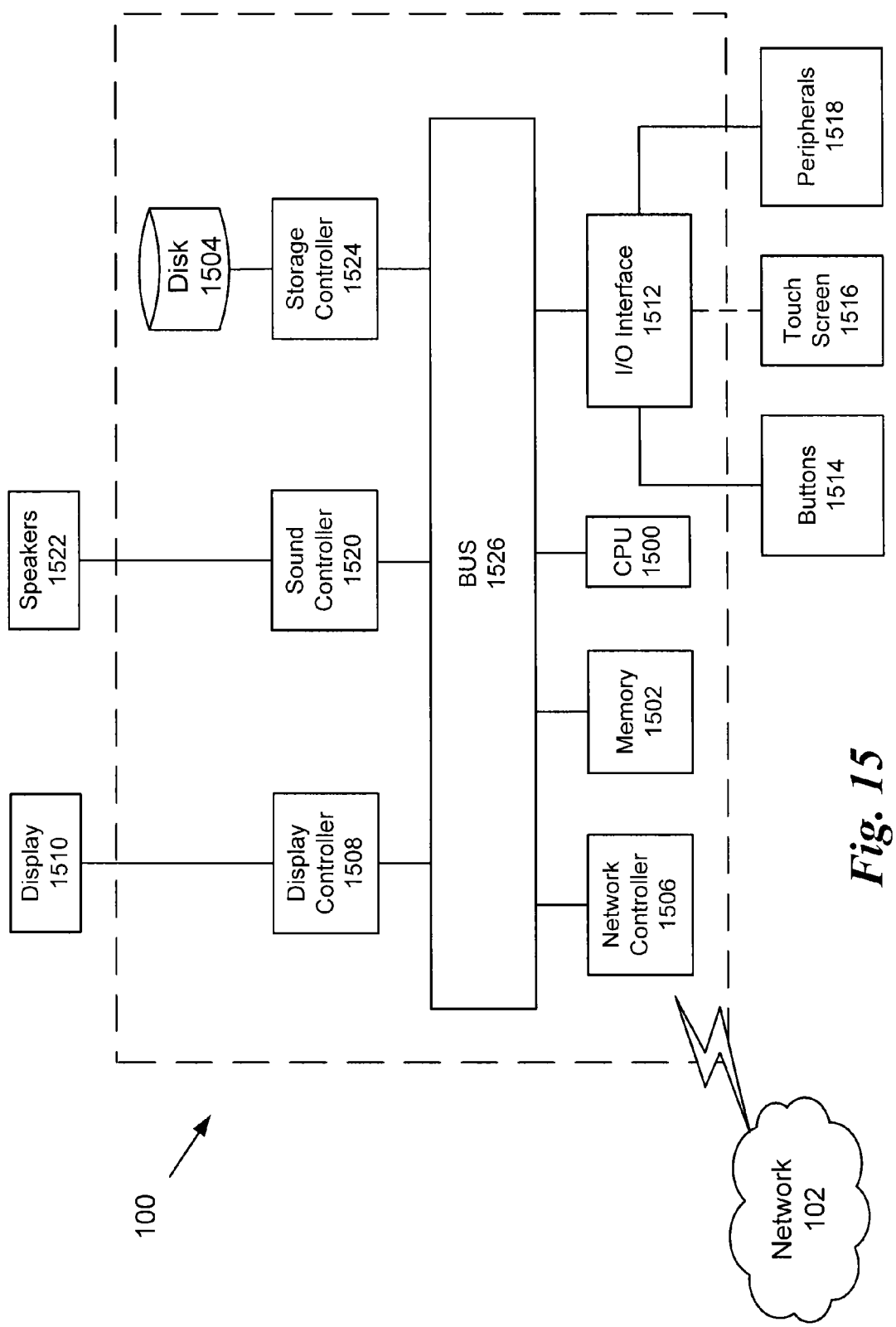
FIG. 15 is an exemplary block diagram of a server according to one example.

FIG. 1 is an exemplary schematic of a system for vehicle localization using a hybrid communication layer according to one example. FIG. 1 depicts a road 114 that is part of a road system in a geographic area. Two vehicles 108,116 are shown as traveling on the road 114. Each of the vehicles 108,116 may be equipped with a Bluetooth device 112. The vehicle 108 may also be equipped with a WiFi device 110. The vehicles 108, 116 may be cars, motorcycles, bicycles, boats, planes and any other structure used for transportation. The vehicle location may be transmitted by the plurality of communication methods to the server 100. The server 100 may transmit the vehicle location via network 102 to users. The network 102 is any network that allows the server 100 and the communication devices to communicate information with each other such as wide Area network, local area network or the Internet. FIG. 1 shows a cellular tower 106, a satellite 104, a Bluetooth device 112 and a WiFi device 110. In selected embodiments, the vehicle 108 may communicate with the vehicle 116 using the Bluetooth device 112. The vehicle 116 may communicate its location to the vehicle 108. The vehicle 108 can then transmit the location of vehicle 116 using a communication technique that may not be available in the vehicle 116. For example, the vehicle 108 is equipped with the WiFi device 110 while the vehicle 116 is not. The vehicle 108 may transmit the location of vehicle 116 to the server 100 using the WiFi device 110. In one embodiment, Bluetooth readers can be placed alongside the road 114. The Bluetooth readers can detect a Bluetooth device 112 in the vehicle 108. The Bluetooth readers then can transmit the vehicle location using the communication circuitry to the server 100 via the network 102. The server 100 includes a CPU 1500 and a memory 1502 as shown in FIG. 15.

Figure 2:
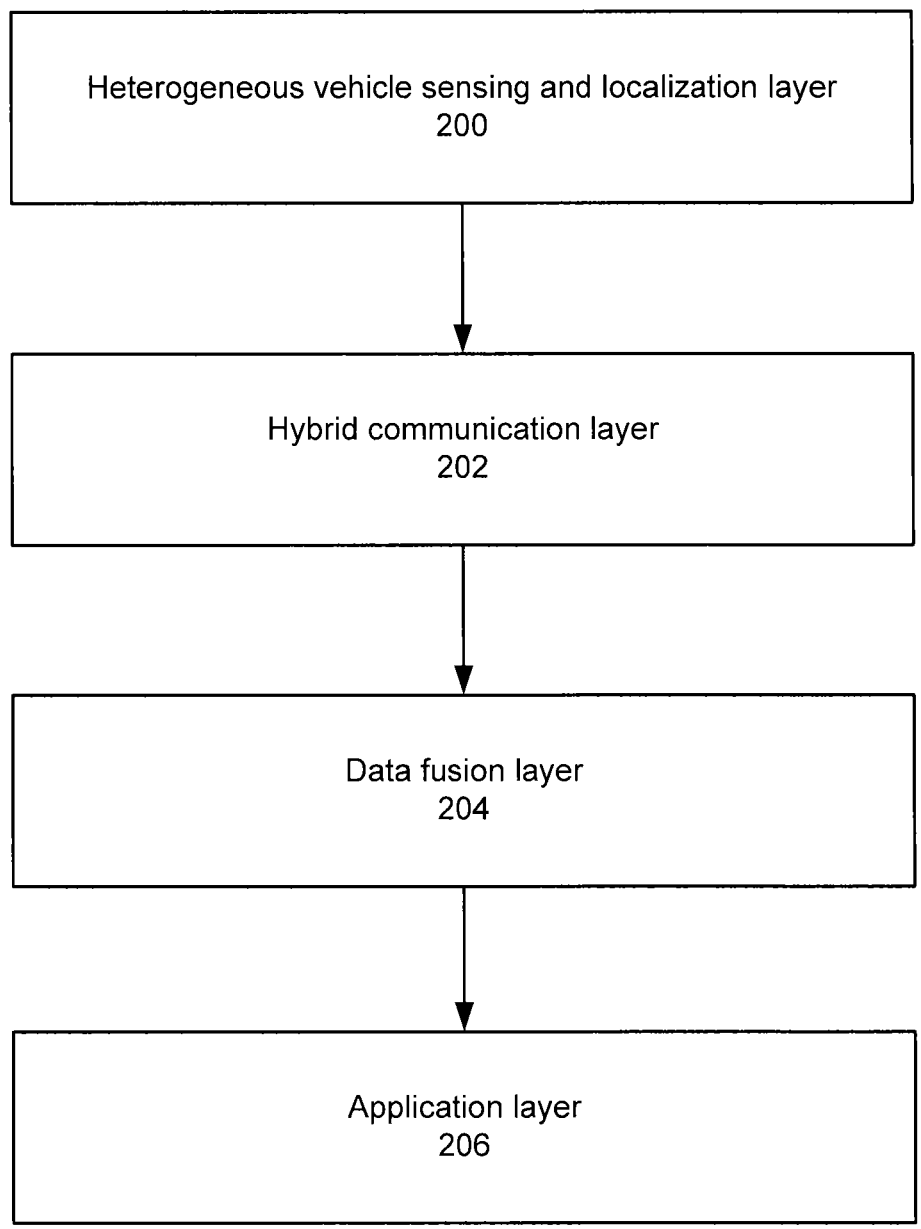
FIG. 2 is a diagram showing the various layers of the system for vehicle localization using a hybrid communication layer according to one example.

FIG. 2 is a diagram showing the various layers of the system for vehicle localization using a hybrid communication layer according to one example. FIG. 2 illustrates four layers: a heterogeneous vehicle sensing and localization layer 200, the hybrid communication layer 202, a data fusion layer 204 and an application layer 204 although this is exemplary and more or less layers may be used. The layered architecture enables technology independence and heterogeneity. The heterogeneous vehicle sensing and localization layer 200 role is to detect the presence of the vehicles 108,116 via at least one of the above-noted methods. The vehicle location is then transmitted by the hybrid communication layer 202 to the data fusion layer 204. The hybrid communication layer 202 provides for the plurality of communication methods. The data fusion layer 204 transmits processed data to the application layer 206. The application layer 206 can provide services to a third party.

Figure 3:
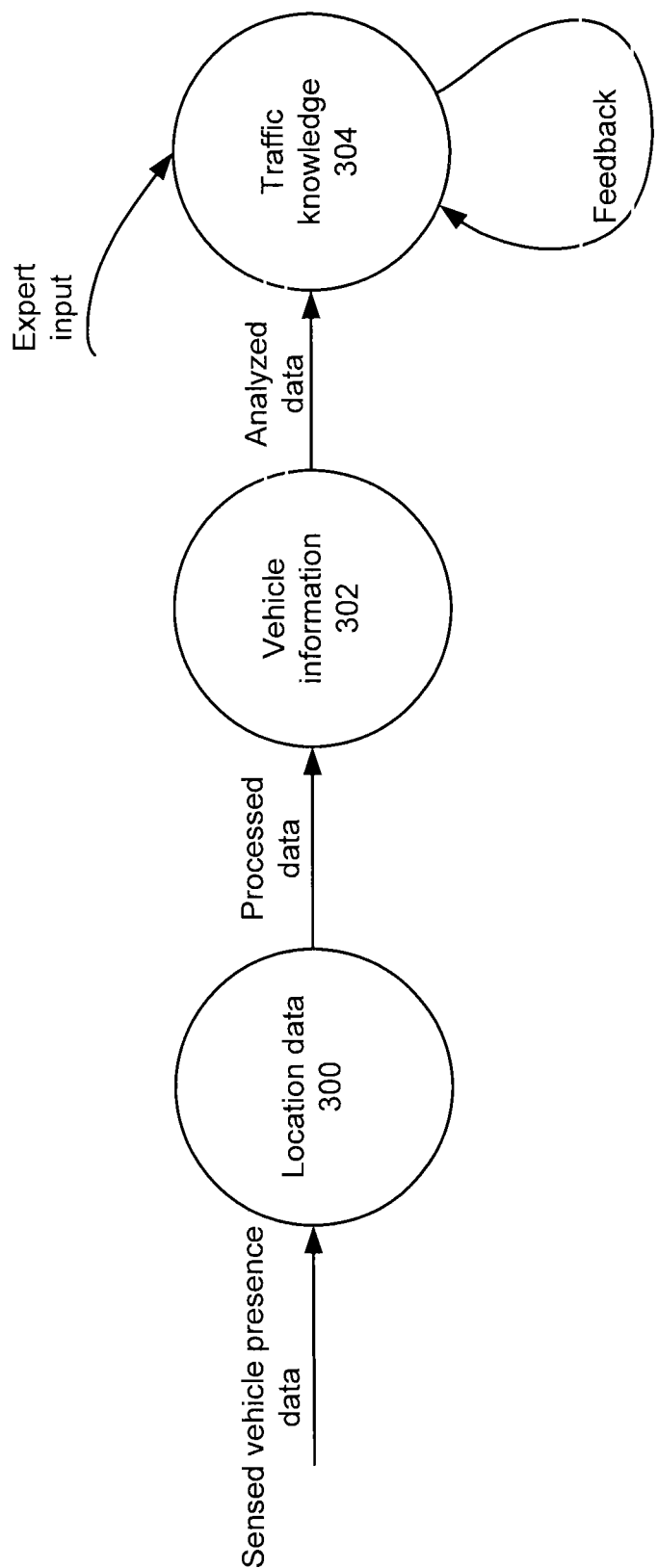
FIG. 3 is an exemplary schematic showing the flow of data through the system according to one example.

FIG. 3 is an exemplary schematic showing the flow of data through the system according to one example. Vehicle presence data is collected by the heterogeneous vehicle sensing and localization layer 200. The vehicle presence data is data that indicates the position of the vehicle. The vehicle presence data may be longitudinal and latitude coordinates. The vehicle presence data is then transformed into location data 300 in the data fusion layer 204. In one embodiment, a first localization technique may detect that the vehicle location is in a broad area; a second localization technique may further refine the vehicle location. For example, the vehicle 108 may be travelling on the road 114 that has an overpass. A satellite based localization technique may detect the vehicle location but may fail to determine if the vehicle is on the overpass or below the overpass. The second localization technique such as a Bluetooth reader based localization method may then accurately locate the vehicle. In selected embodiments, the Bluetooth readers are positioned in strategic locations such on and below the overpass. The strategic locations may be locations where the first localization technique is known to fail based on past data or the technological limitations of the method. The vehicle information 302 is gathered from the processed data by the CPU 1500. In one embodiment, the CPU 1500 may analyze road image sequences to obtain vehicle counts. In one embodiment, the vehicle count method may be that disclosed in U.S. Pat. No. 5,247,297 entitled "VEHICLE DETECTOR METHOD FOR MULTIPLE VEHICLE COUNTING", the entire disclosure of which is incorporated herein by reference. The vehicle information 302 includes one or more of, but not limited to, counts, speeds and tracking information. Finally, the analyzed data may be processed with feedback from the system in supervision of the third party such as experts to create a traffic knowledge 304 database.

The hybrid communication layer 202 is responsible to provide a medium for the heterogeneous vehicle sensing and localization layer 200 for transmitting vehicle location data to the data fusion layer 204. In a mixed terrain environment, a single communication mechanism fails to provide reliable and robust transmission. For example in Makkah, there are hills, tunnels, valleys and high-rise building that cause uneven distribution of 3G/4G data network coverage. Moreover, extremely high number of mobile services users during Hajj and Ramadan season congests the network. The hybrid communication layer 202 consists of all available communication technologies such as wireless 3G/4G data networks, WiFi, Bluetooth, Infra-red, unlicensed radio channels, barcode readers, satellite communication or other communication method as understood by one of ordinary skill in the art. Hence, each vehicle detection mechanism has the liberty to use multiple communication technologies to ensure data delivery.

Figure 4:
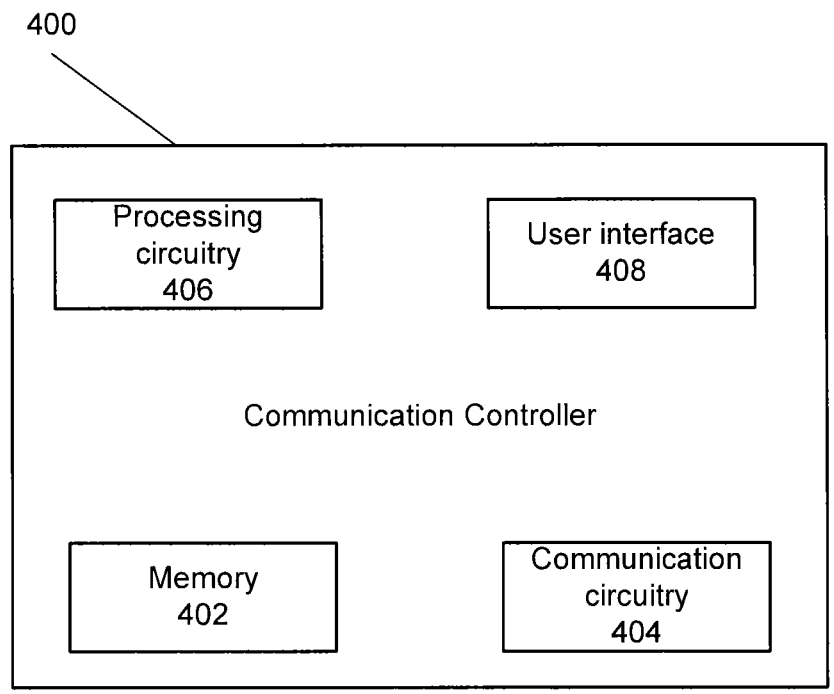
FIG. 4 is an exemplary block diagram of a communication controller according to one example.

FIG. 4 is an exemplary block diagram of a communication controller according to one example. The communication controller 400 may be included as part of the vehicles 108, 116 according to one embodiment. The communication controller 400 circuitry is operable to transmit data to and receive data from one or more remote devices. For example, the data may be voice, text or multimedia data. In selected embodiments, the remote device can be the server 100. The communication controller 400 may be a combination of hardware, software, and firmware components. In FIG. 4, the communication controller 400 includes a memory 402, processing circuitry 406, the communication circuitry 404 and a user interface 408. The memory 402 may be one or more memory modules that store data. In one embodiment, the memory 402 may store a transmission log. A transmission log may contain information about a transmission such as the communication method used, a time, a date and a status of the transmission. The processing circuitry 406 may execute computer-readable program instructions contained in the memory 402. The communication circuitry 404 may be one or more communication circuitry necessary to transmit data using the communication methods and technologies used by the system. The user interface 408 may include a keypad. In selected embodiments, the user interface 408 may be used to troubleshoot the communication controller 400. The keypad may be used to input data into the communication controller 400. The user interface 408 also allows a user to obtain information from the communication controller 400. In selected embodiments, the user interface may include a display screen. The user may use the user interface 408 to display information on the display screen.

The information may be information about the status of the communication technologies used by the system.

Figure 5:
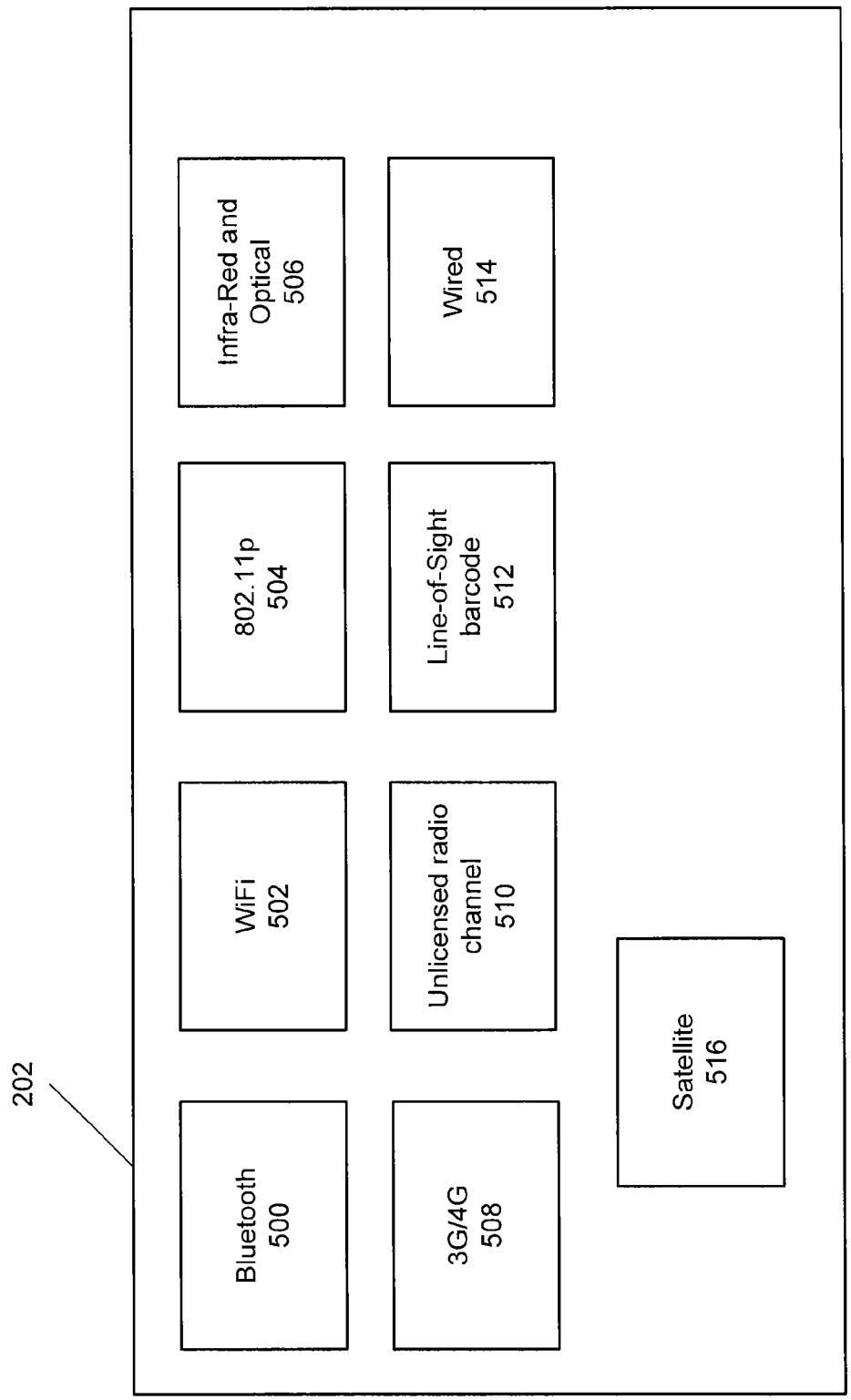
FIG. 5 is an exemplary block diagram of the hybrid communication layer according to one example.

FIG. 5 is an exemplary block diagram of the hybrid communication layer 202 according to one example. In one embodiment, the hybrid communication layer 202 may include, but not limited to, a Bluetooth 500, a WiFi 502, a 802.11p 504, an infrared and optical 506, a 3G/4G 508, an unlicensed radio channel 510, a line of sight barcode reader 512, a wired 514 and satellite 516 based communication methods. The hybrid communication layer 202 may include other communication technologies as would be understood by one of ordinary skill in the art.

Figure 6:
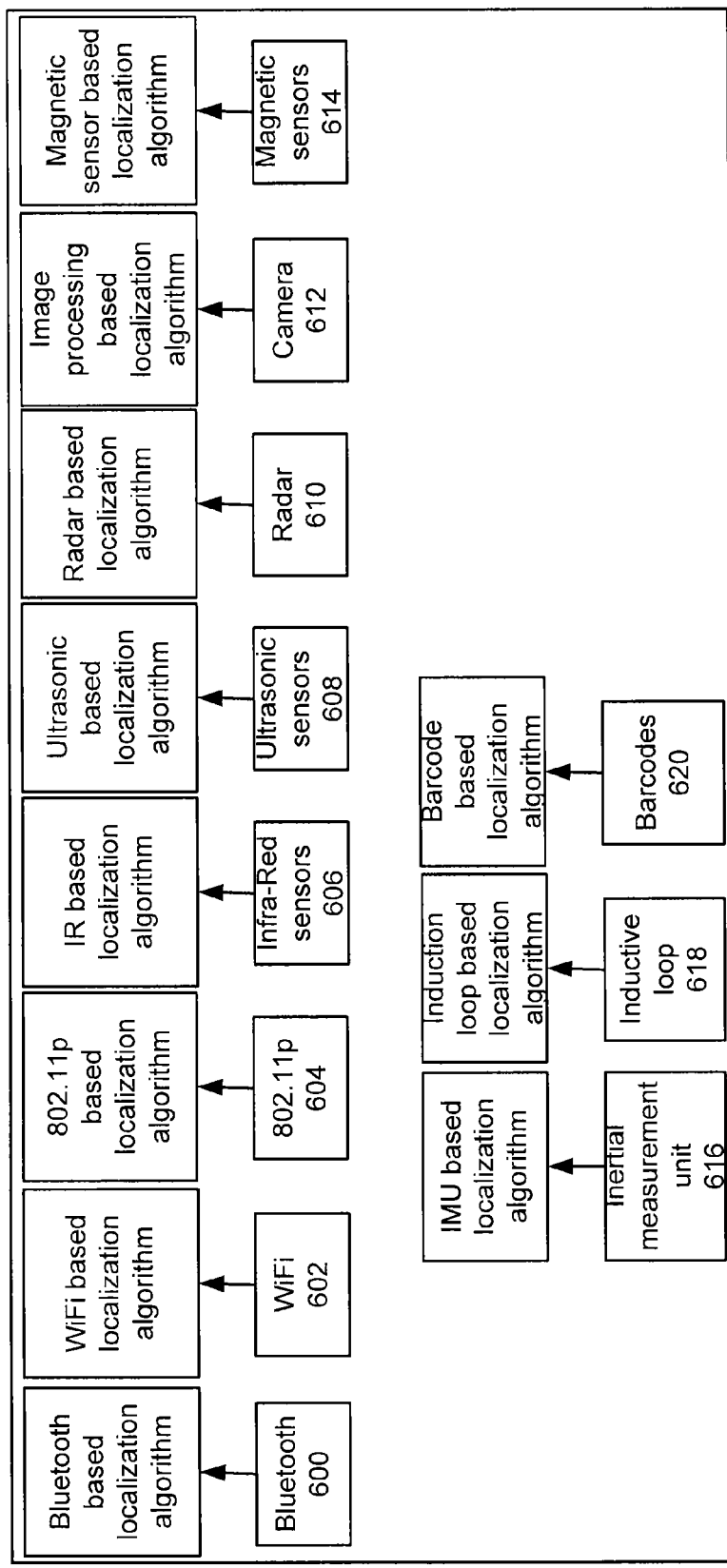
FIG. 6 is an exemplary block diagram of a heterogeneous vehicle sensing and localization layer according to one example.

FIG. 6 is an exemplary block diagram of a heterogeneous vehicle sensing and localization layer 200 according to one example. The heterogeneous vehicle sensing and localization layer 200 consists of all technologies that can be used to detect the presence of vehicles on the road 114 such as Bluetooth 600, WiFi 602, 802.11p 604, infrared 606, ultrasonic sensors 608, radar 610, cameras 612, magnetic sensor 614, inertial measurement units 616, inductive loops 618 and machine readable barcodes 620 based localization methods. In selected embodiments, the heterogeneous vehicle sensing and localization layer 200 may be implemented by a localization unit. The localization unit includes the necessary processing circuitry to execute algorithms corresponding to localization methods as would be understood by one of ordinary skill in the art to identify the location of the vehicle. For example, a Bluetooth based localization algorithm may be used to identify the location of the vehicle 108 using data collected by the Bluetooth based localization method 600 as would be determined by standard localization techniques. A WiFi based localization algorithm may be used to identify the location of the vehicle 108 using data collected by the WiFi based method 602 as would be determined by standard localization techniques. The availability of each localization method may depend on the geographic location, weather conditions, the vehicle make, model and year, and the like. Each of the localization method may have a different accuracy level as would be understood by one of ordinary skill in the art.

Figure 7:
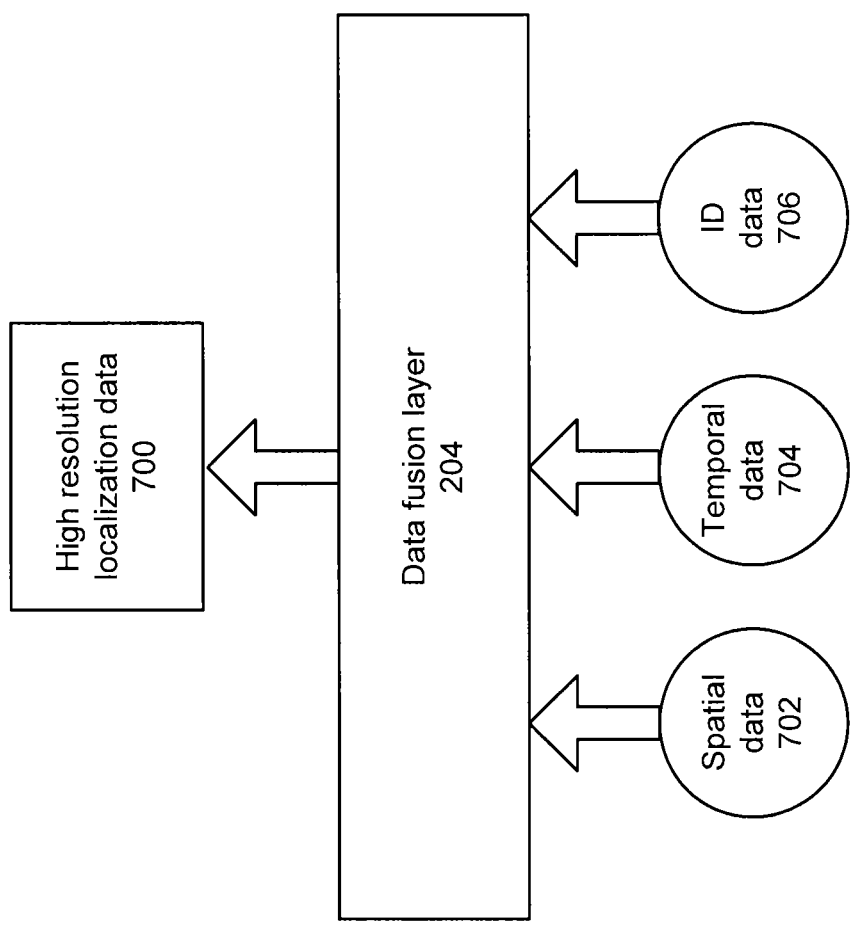
FIG. 7 is an exemplary block diagram illustrating the data flow in the data fusion layer according to one example.

FIG. 7 is an exemplary block diagram illustrating the data flow in the data fusion layer 204 according to one example. The data fusion layer 204 receives multiple vehicle location data through various localization algorithms using metrics such as geospatial, sensor fusion, cellular data, situation assessment and image data. This layer integrates all the different sources to construct high resolution localization data 700. In selected embodiments, upon determining the broad area where the vehicle is located using the first localization technique, the system using the CPU 1500 may determine the second localization technique from which to collect data to locate precisely the vehicle. The first localization technique may be a cellular tower based localization method and the second localization technique may be a barcode reader based localization method. Once the broad area is determined using the first localization technique, then data is collected from the barcode readers located within the broad region only. The barcode readers may be located at the entrance of tunnels. Barcodes may be painted or stickered on the vehicle. Each barcode may correspond to a vehicle identification. The barcode reader detects the barcode available on the vehicle and then transmits it to the server 100. The barcode readers may be installed at predetermined intervals in the tunnel which permits the application layer 206 to obtain more information about the vehicle. The information may include the speed of the vehicle, whether the vehicle has stopped, or whether the vehicle took an exit in the tunnel. As trying to collect data from all barcode readers may be time consuming and hence ineffective, in other embodiments, once the broad region is determined, the CPU 1500 may determine which other available localization technique should be used. For example, the CPU 1500 may determine that Bluetooth readers are available in the broad region. The CPU 1500 may determine which methods are available in the broad area by using a localization look-up table stored in the memory 1502. An exemplary localization look-up table is shown and described in FIG. 14. The data fusion layer 204 receives spatial data 702, temporal data 704 and ID data 706. The spatial data 702 are received from the localization layer via the communication controller 400. The identification (ID) data may be transmitted to the server 100 using the communication circuitry 404. In selected embodiments, the ID may be a unique number associated with the communication controller 400.

Figure 8:
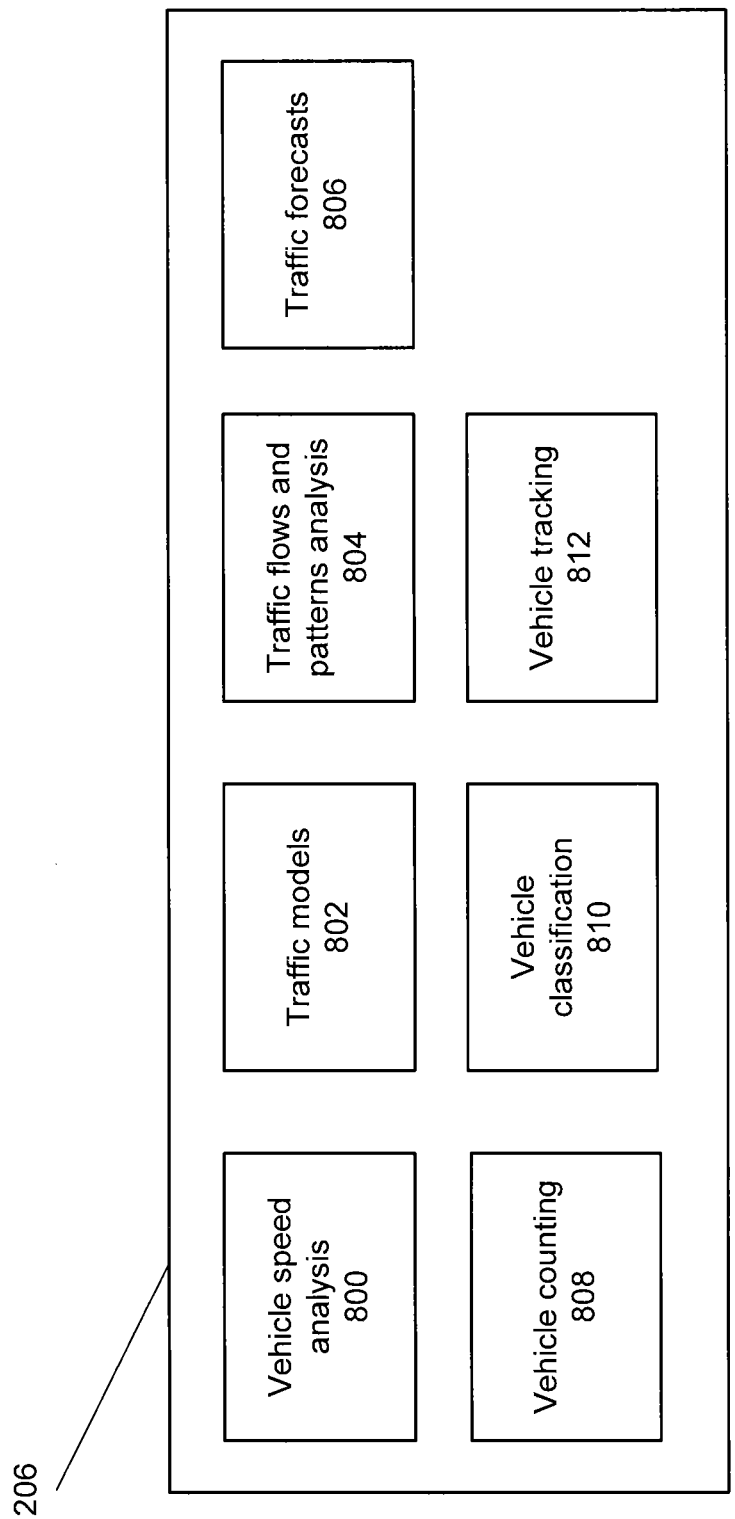
FIG. 8 is an exemplary block diagram of the application layer according to one example.

FIG. 8 is an exemplary block diagram of the application layer 206 according to one example. The application layer 206 uses the high resolution localization data 700 in applications such as vehicle counting, vehicle classification, speed analysis, tracking, analysis of traffic flows and traffic patterns, generating traffic models and traffic prediction. In FIG. 8, the application layer 206 includes a vehicle speed analysis 800, a traffic model 802, a traffic flows and patterns analysis 804, a traffic forecast 806, a vehicle counting 808, a vehicle classification 810 and vehicle tracking 812 modules. In one embodiment, the traffic forecast 806 may be that disclosed in U.S. Pat. No. 7,813,870 B2 entitled "DYNAMIC TIME SERIES PREDICTION OF FUTURE TRAFFIC CONDITIONS", the entire disclosure of which is incorporated herein by reference. The server 100, using the CPU 1500, then analyzes the data received to generate traffic information. The traffic information can include traffic speeds and travel times. The server 100 may provide the traffic information to businesses providing a traffic service and/or consumers using various traffic enabled devices such as a navigation system.

Figure 9:
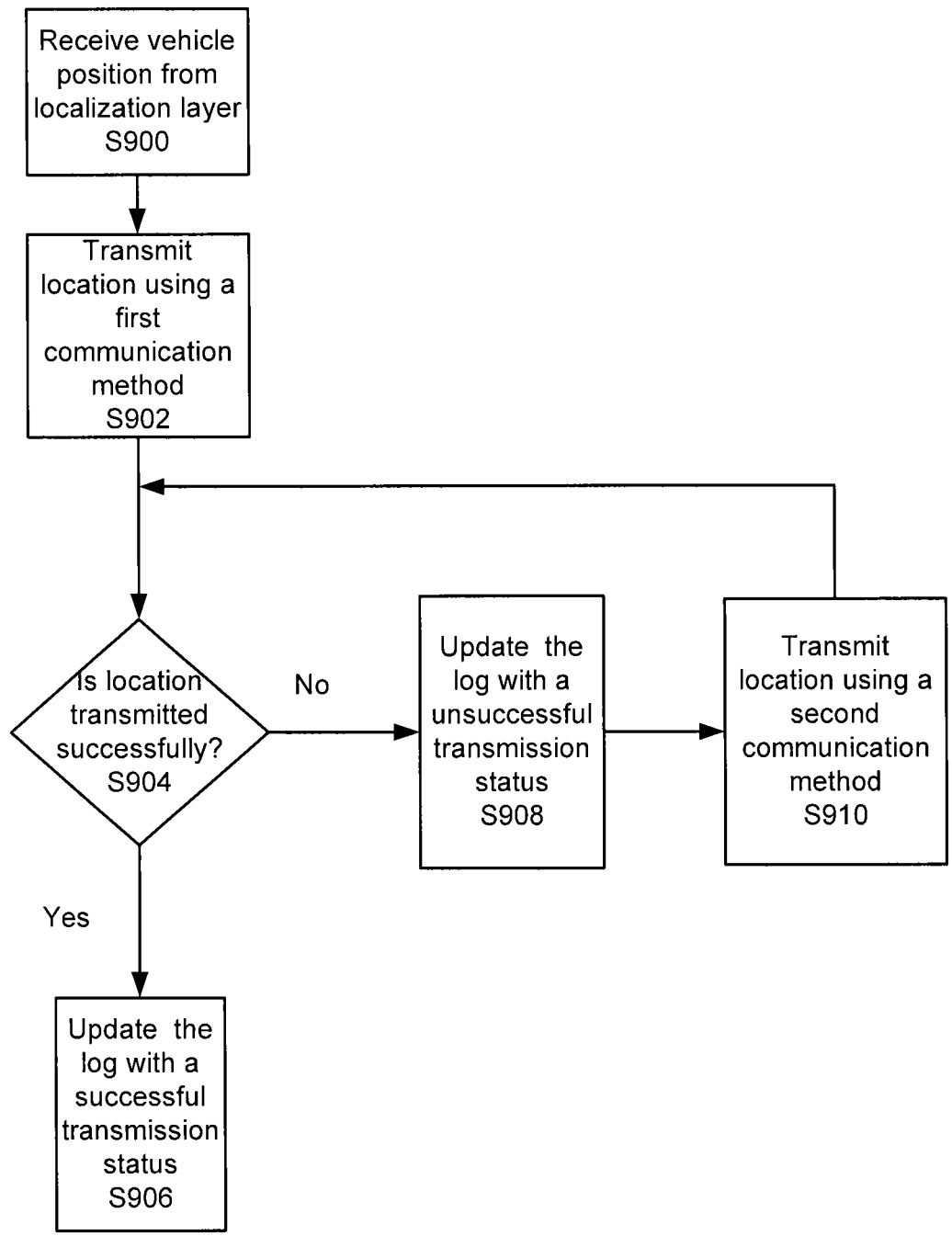
FIG. 9 is an exemplary flow chart to update a transmission log according to one example.

FIG. 9 is an exemplary flow chart to update the transmission log. At step S900, the communication controller 400 receives the vehicle location from the localization layer 200. At S902, the communication controller 400 transmits the vehicle location using a first communication method. Next at step S904, the processing circuitry 406 determines the status of a communication attempt to transmit the vehicle location. The status may be obtained by checking the return acknowledge or any other status reporting technique. The status indicates whether the vehicle location was transmitted successfully or not. Then at S906, if the vehicle location was successfully transmitted, the transmission log is updated with a status indicator of "successful". If the vehicle location was not transmitted successfully then at step S908 the transmission log is updated with a "unsuccessful" transmission status. At S910, the location is transmitted using another communication method. In selected embodiments, the algorithm continues until all available communication methods are used or when a successful transmission is made.

FIG. 10 shows transmission logs 1000, 1002 from two communication controllers according to one example. The transmission log 1000, 1002 may be generated by the communication controller 400. The transmission log may be stored in the memory 402 of the communication controller 400 of the vehicle 108, 116. In one embodiment, the transmission log may include one or more of, but not limited to, the vehicle identification, the vehicle location as GPS coordinates, a communication method, the date, the time and a result. The result indicates if the communication method was successful or not to transmit the vehicle location. The result may be determined as described here. In one embodiment, the communication controller 400 may receive an acknowledgment packet to indicate that the transmission was successful. The transmission log may be transmitted to the server 100 via the communication circuitry 404. The transmission log 1000 shows that the communication controller transmitted unsuccessfully the location of vehicle 902A using a WiFi based communication method at 15:06. Then, the communication controller 400 transmitted the vehicle location successfully using a 3G/4G based communication method at 15:07. While FIG. 10 shows two transmission logs, it is understood that several communication controllers, corresponding to several vehicles, may generate several transmission logs.

FIG. 11 shows a merged transmission log 1100 from the transmission logs 1000, 1002 according to one example. The communication controller 400 may transmit to the server 100 via the communication circuitry 404 the transmission log 1000. The server 100 receives several transmission logs corresponding to several vehicles. The server 100 using the CPU 1500 may then produce the merged transmission log 1100. The merged transmission log 1100 may be stored in the server 100. In selected embodiments, the server 100 may analyze, using the CPU 1500, the merged transmission log 1100 to determine successful communication method corresponding to certain areas. In selected embodiments, the analysis may be done by calculating the number of successful transmission for each method in a certain area. A preferable communication method in the certain area may be the method with the highest number of successful transmission. In other embodiments, the server 100 may calculate a successful transmission rate based on the number of successful transmission and the total number of transmission in the certain area. The preferable communication method is then the method with the highest successful transmission rate. In other embodiments, a certain communication method may be chosen as the preferable communication method if it achieves a certain number of successful attempts in a predetermined period. In selected embodiments, each communication method may be weighted based on a local terrain type. For example, in high rise building areas, the satellite based communication method 516 may be given a lower weight than the line of sight barcode reader communication method 512. In high rise building areas, the satellite based communication method 516 have a higher error rate due to multipath signals and the lack of visible satellites. In rugged terrain or mountainous region, a higher weight is given to the satellite based communication method 516 than to the 3G/4G communication method 508 because cellular coverage may be weak or non-present in mountains. The analysis may also include other factors such as the weather, the date and time or other factors that may affect transmission quality. The analysis also includes the presence of communication obstacles such as tunnels or lakes. For example, on lakes, the communication controller 400 may choose the satellite based communication method 516. The analysis may be time sensitive. For example, the calculations described above may include transmission attempts made only during the last predetermined number of days. For example, the predetermined number of days maybe thirty days. The server 100 may then send the analysis to the communication controller 400. The communication controller 400 may store the analysis in the memory 402. The processing circuitry 406 may use the analysis to determine the preferable communication method. The processing circuitry 406 may determine trends using techniques such as Neural networks as would be understood to one of ordinary skill in the art. For example, a certain communication technique may result in a higher probability of communication failure in inclement weather or may become overloaded in a certain period of time. In addition, the communication controller 400 may check whether other vehicles are present within a predetermined distance. In response to determining that another car is within the predetermined distance, the communication controller 400 may use its preferable communication method as the preferable communication method.

Figure 12:
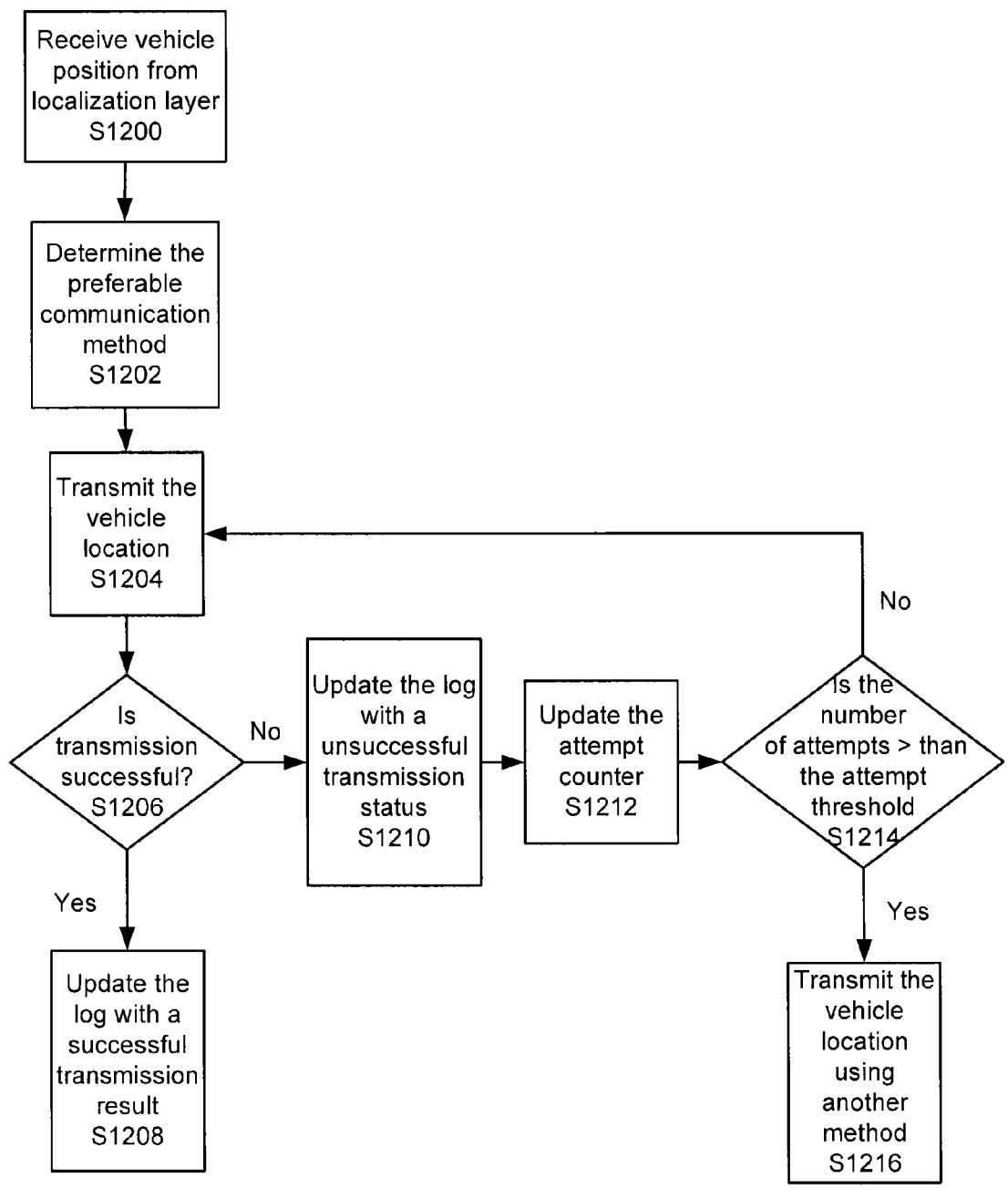
FIG. 12 is an exemplary flow chart to transmit a vehicle location using a preferable communication method according to one example.

FIG. 12 is an exemplary flow chart to transmit the vehicle location using the preferable communication method according to one example. At step S1200, the communication controller 400 receives the vehicle 108 location from the heterogeneous vehicle sensing and localization layer 200. At step S1202, the communication controller 400, using the processing circuitry 406, determines the preferable communication method. The processing circuitry 406 may use the past transmission attempts to determine the preferable communication method. The processing circuitry 406 can use a last known vehicle location and stored successful communication from the merged transmission log 1100 to determine the preferable communication method as described previously herein. At step S1204, the vehicle location is transmitted via the communication circuitry 404 of the preferable communication method. At step S1206, the communication controller 400 using the processing circuitry 406 checks if the transmission is successful. If the transmission is successful then the process goes to step S1208. At S1208, the transmission log is updated with a "successful" indicator status. If the transmission is not successful then the process goes to step S1210. At step S1210, the transmission log is updated with a "unsuccessful" transmission status indicator. At step S1212, an attempt count/number is increased by a predetermined incremental value. At step S1214, the processing circuitry 406 compares the attempt count/number with a predetermined attempt threshold. At step S1216, if the attempt count/number is greater than the attempt threshold then the vehicle location is transmitted using another method. The attempt count/number is reset after a successful transmission. If the attempt count/number is less than the attempt threshold then the process goes to step S1204.

Further, the communication controller 400 can use the past vehicle positions and the direction of travel to predict a probable vehicle trajectory. In one embodiment, the vehicle prediction method and system may be that disclosed in U.S. patent application US 2014/0148970 A1 entitled "NAVIGATION SYSTEMS AND VEHICLES FOR PREDICTING ROUTES", the entire disclosure of which is incorporated herein by reference. The processing circuitry 406 may then compare the probable vehicle trajectory with maps stored in the memory 402 to check for communication obstacles such as the presence of a tunnel. If a communication obstacle is detected, then the processing circuitry 406 may match the communication obstacle with the preferable communication method. This can be done by using a look-up table stored in the memory 402. In selected embodiments, the look-up table lists for each communication obstacle type the preferable communication method that can be used to overcome the communication obstacle. In one example, if the predicted trajectory shows a tunnel then the communication controller 400 can determine that the preferable communication method is a radio frequency identification based communication method and avoid using a 3G/4G based communication method. This allows continuous vehicle localization without communication failure due to communication obstacles. The look-up table can be updated at predetermined intervals or when technological advancements are made. Communication experts can update the look-up table by connecting to the server 100 via the network 102. For example, once Bluetooth readers are installed inside a tunnel A the communication experts may update the look-up table indicating that Bluetooth reader based communication method is the preferable communication method in tunnel A. The server 100 may send the updated look-up table to the communication controller 400. In other embodiments, the communication controller 400 may connect at predetermined intervals to the server 100 to download the look-up table thereby keeping the table up to date.

In other embodiments, the server 100 may receive by the third party through the network 102 information indicating the status of the communication method. For example, the satellite based communication method 516 may fail due to a technical problem in the satellite 104. The server 100 can send to the communication controller 400 the status of the communication method. The server 100 may also update the look-up table based on the information. The server 100 may then send the updated look-up table to the communication controller 400. The communication controller 400, via the processing circuitry 406, can avoid choosing it as the preferable communication method. In other embodiments, one communication method may be congested due to an event such as athletics events or religious pilgrimage in a city. The server 100 may generate and send an alert to the communication controller 400 to avoid using the congested communication method and use an alternative communication method. The communication controller 400, via the communication circuitry 404, may connect to the server 100 to check on the status of the communication method. In selected embodiments, when a communication failure occurs after a transmission attempt by the communication circuitry 400 using the communication method, the communication controller 400 may avoid using the communication method before a predetermined amount of time has passed thus optimizing battery and data usage. The predetermined amount of time may be based on available battery power of the communication controller 400. For example, once the available battery power drops below a predetermined threshold, the predetermined amount of time may be increased. This allows for the conversation of available battery power in case of a vehicle breakdown. In selected embodiments, the predetermined amount of time may be based on a distance traveled by the vehicle after the communication failure using the communication method. The distance traveled may be obtained from the odometer of the vehicle. In other embodiments, the distance traveled may be obtained from an accelerometer included in the communication controller 400. Once the distance traveled is larger than a predetermined distance the communication method may be used again by the communication controller 400. For example, the predetermined distance may be set to 10 miles. This is due to that the area may have changed and the communication method may be available in the new area.

Further, the third party may upload updates to the server 100 about the availability of communication technologies in a region. For example, if a new cellular tower 106 is installed in a region A, the communication experts may indicate that the 3G/4G is the preferable communication method in this region. The server 100 then can send the updates to the communication controller 400. The communication controller 400 may use the updated information when determining the preferable communication method. The communication controller 400 can connect to the server 100 at predetermined interval to download any updates.

In selected embodiments, the user may choose to transmit the vehicle location using all available communication methods in response to determining there is an emergency. The user may indicate an emergency using the user interface 408. The user interface 408 may include an emergency button. In response to the user, pressing the emergency button the communication controller 400 may use all available communication methods to transmit the vehicle location to the third party such as first respondent, police, firefighters or the like. Transmitting the vehicle location using all available methods simultaneously and before waiting for one method to fail may save precious time. In this case, knowing the vehicle location has a higher priority than optimizing resources. In other embodiments, the emergency may be detected by the deployment of airbags. The emergency may be also detected by speech recognition of a preprogrammed phrase such as "Help" using the processing circuitry 406.

Figure 13:
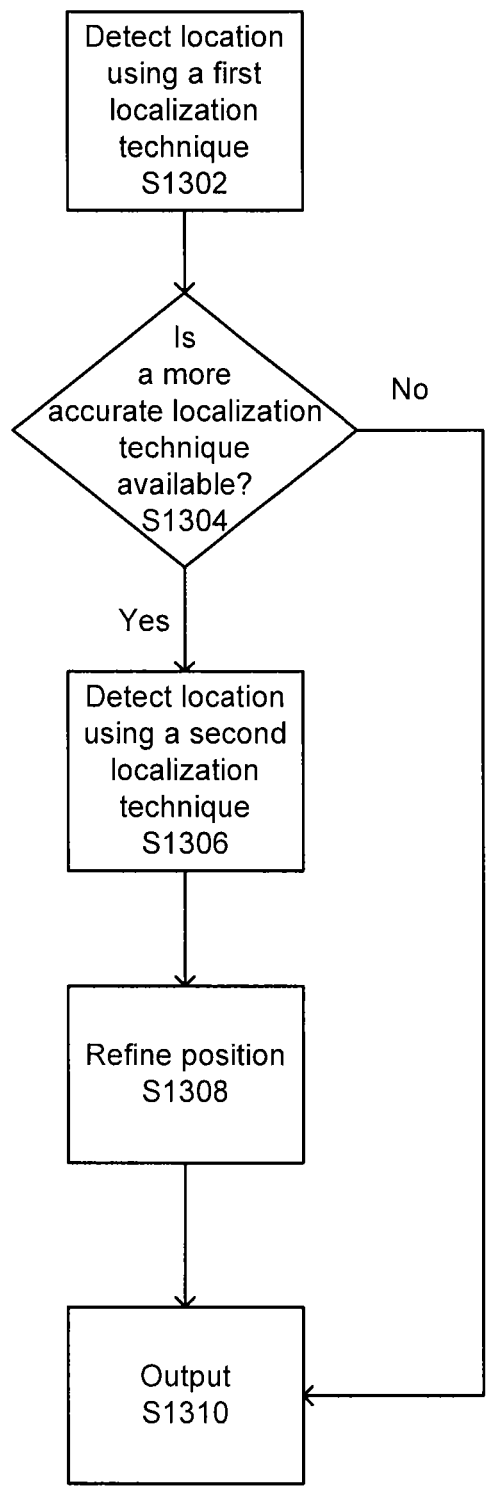
FIG. 13 is an exemplary flow chart to locate a vehicle according to one example.

FIG. 13 is an exemplary flow chart to locate a vehicle according to one example. At step S1302, the vehicle location is detected using a first localization technique. The first localization technique may be one of the available methods shown in FIG. 6. In one embodiment, the first localization technique is chosen as the method depending on the widespread availability of the localization technique such as GPS or cellular based method. Once a vehicle location is known, the communication controller 400 may transmit the vehicle location to the server 100 using the preferable communication method as shown and described in FIG. 12. At step S1304, the CPU 1500 may check based on the vehicle location whether a second method with a higher accuracy is available. The CPU 1500 may use the localization look-up table shown and described in FIG. 14 to determine the availability of localization techniques in an area. The localization look-up table may be stored in the memory 1502. In other embodiments, the localization look-up table may be stored in the memory 402 of the communication controller 400. In response to determining that a second localization technique with a higher accuracy is available, the vehicle location may be detected using the second localization technique at step S1306. In selected embodiments, the CPU 1500 may check whether the accuracy improvement is higher than an accuracy threshold. In response to determining that the accuracy improvement is higher than the accuracy threshold, the vehicle location is detected using the second localization technique. The accuracy threshold may be set by the user. In other embodiments, the accuracy threshold may also depend on the module in the application layer 206 requesting the vehicle location.

In selected embodiments, additional localization techniques may be used until an accuracy level is achieved or all available localization techniques are used. The accuracy level may depend on the application requesting the vehicle location. For example, if the vehicle location is to be used with a collision warning system application, the accuracy level may be chosen higher than when the vehicle location is to be used by a weather data application. The accuracy level may be set by the third party. At step S1308, the vehicle location is refined in the data fusion layer 204. At step S1310, the vehicle location may be transmitted via the network 102 to host applications.

FIG. 14 is an exemplary localization look-up table showing localization techniques available in a plurality of areas according to one example. In one embodiment, the localization look-up table 1400 may include one or more of, but not limited to, an area, a localization technique, an accuracy, and a status. The area may be identified by longitudinal and latitude coordinates of its boundary. The area may also be identified by the name of the city. The status may indicate the current status of the localization technique. The CPU 1500 may avoid using the localization technique if the status indicates "Not Ok" which may indicate a failure in equipment used by the localization technique.

FIG. 15 is an exemplary block diagram of the server 100 according to one example. In FIG. 15, the server includes a CPU 1500 which performs the processes described above. The process data and instructions may be stored in memory 1502. These processes and instructions may also be stored on a storage medium disk 1504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the mobile device communicates, such as a server or computer.

Further, the claimed advancements may be provided as a utility application, background daemon, or component of an operating system, or combination thereof, executing in conjunction with CPU 1500 and an operating system such as Microsoft Windows 7, UNIX, Solaris, LINUX, Apple MAC-OS and other systems known to those skilled in the art.

CPU 1500 may be a Xenon or Core processor from Intel of America or an Opteron processor from AMD of America, or may be other processor types that would be recognized by one of ordinary skill in the art. Alternatively, the CPU 1500 may be implemented on an FPGA, ASIC, PLD or using discrete logic circuits, as one of ordinary skill in the art would recognize. Further, CPU 1500 may be implemented as multiple processors cooperatively working in parallel to perform the instructions of the inventive processes described above.

The server in FIG. 15 also includes a network controller 1506, such as an Intel Ethernet PRO network interface card from Intel Corporation of America, for interfacing with network 102. As can be appreciated, the network 102 can be a public network, such as the Internet, or a private network such as an LAN or WAN network, or any combination thereof and can also include PSTN or ISDN sub-networks. The network 102 can also be wireless such as a cellular network including EDGE, 3G and 4G wireless cellular systems. The wireless network can also be WiFi, Bluetooth, or any other wireless form of communication that is known.

The server further includes a display controller 1508, such as a NVIDIA GeForce GTX or Quadro graphics adaptor from NVIDIA Corporation of America for interfacing with display 1510, such as a Hewlett Packard HPL2445w LCD monitor. A general purpose I/O interface 1512 interfaces with a keyboard and/or mouse 1514 as well as a touch screen panel 1516 on or separate from display 1510. General purpose I/O interface also connects to a variety of peripherals 1518 including printers and scanners, such as an OfficeJet or DeskJet from Hewlett Packard.

A sound controller 1520 is also provided in the server, such as Sound Blaster X-Fi Titanium from Creative, to interface with speakers/microphone 1522 thereby providing sounds and/or music.

The general purpose storage controller 1524 connects the storage medium disk 1504 with communication bus 1526, which may be an ISA, EISA, VESA, PCI, or similar, for interconnecting all of the components of the server 100. A description of the general features and functionality of the display 1510, keyboard and/or mouse 1514, as well as the display controller 1508, storage controller 1524, network controller 1506, sound controller 1520, and general purpose I/O interface 1512 is omitted herein for brevity as these features are known.

A system which includes the features in the foregoing description provides numerous advantages to the users. In particular, the system transmits the vehicle location using the plurality of communication methods thus minimizing transmission failures due to communication obstacles. The system helps the users transmit vehicle locations to first responders in case of emergency. In such cases, it is important to transmit the vehicle location as quickly and precisely as possible. Using the plurality of communication methods with multiple localization techniques gives the advantages of getting the vehicle location with high precision. The system is able to choose the communication method based on the vehicle location, the transmission log and communication network status.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A vehicle localization and transmission method comprising:
   detecting, via processing circuitry, a vehicle location;
   storing, in a memory, a past transmission log indicating a status of a communication attempt and a corresponding vehicle location;
   determining, by the processing circuitry, a preferable communication method based on the transmission log from a plurality of communication methods as a function of a number of successful communication attempts in a predetermined period obtained from the past transmission log; and
   transmitting, via communication circuitry, the vehicle location using the preferable communication method to host applications requesting the vehicle location.

2. The method of claim 1, wherein the determining is based on a preferable communication method of another vehicle located within a predetermined distance.

3. The method of claim 1, wherein the plurality of communication methods includes at least two of Bluetooth, satellite, WiFi, radio, infrared, 3G/4G and optical based communication methods.

4. The method of claim 1, further comprising:
   retransmitting the vehicle location using another communication method in response to the preferable communication method resulting in a communication failure.

5. The method of claim 1, further comprising:
incrementing a counter in response to determining a communication failure;
transmitting, via the communication circuitry, the vehicle location using another communication method when the counter exceeds a predetermined number; and
resetting the counter when the vehicle location is transmitted successfully.

6. The method of claim 1, further comprising:
determining a probable vehicle trajectory;
detecting a communication obstacle by comparing the probable vehicle trajectory with maps stored in the memory;
determining the preferable communication method based on the communication obstacle; and
transmitting, via the communication circuitry, the vehicle location using the preferable communication method.

7. The method of claim 6, wherein the determining is based on a look up table to match the communication obstacle with the preferable communication method.

8. The method of claim 6, wherein the determining is based on local terrain.

9. The method of claim 1, further comprising:
receiving, via the communication circuitry, a status of a communication method;
updating the past transmission log with the status of the communication method; and
determining the preferable communication method based on the status of the communication method.

10. The method of claim 1, further comprising:
obtaining, via the processing circuitry, the vehicle location using a first localization method;
determining, based on the vehicle location obtained from the first localization method, a second localization method;
obtaining, using the second localization method, the vehicle location; and
refining the vehicle location by combining data obtained from the first localization method and the second localization method.

11. The method of claim 1, wherein detecting the vehicle location based on an accuracy level needed by host applications requesting the vehicle location.

12. The method of claim 1, wherein in response to detecting an emergency via a user interface, the communication circuitry transmits the vehicle location using all available communication methods.

13. A hybrid communication system for transmitting the position of a vehicle comprising:
processing circuitry configured to
detect a vehicle location;
store, in a memory, a past transmission log indicating a status of a communication attempt and a corresponding vehicle location;
determine a preferable communication method based on the transmission log from a plurality of communication methods as a function of a number of successful communication attempts in a predetermined period obtained from the past transmission log; and
transmit, via communication circuitry, the vehicle location using the preferable communication method to host applications requesting the vehicle location.

* * * * *